US011480966B2

(12) United States Patent
Malouf et al.

(10) Patent No.: US 11,480,966 B2
(45) Date of Patent: Oct. 25, 2022

(54) MARINE PROPULSION CONTROL SYSTEM AND METHOD

(71) Applicant: Brunswick Corporation, Mettawa, IL (US)

(72) Inventors: Travis C. Malouf, Germantown, WI (US); Matthew E. Derginer, Butte des Morts, WI (US); Michael J. Lemancik, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 347 days.

(21) Appl. No.: 16/813,798

(22) Filed: Mar. 10, 2020

(65) Prior Publication Data

US 2021/0286362 A1 Sep. 16, 2021

(51) Int. Cl.
*G05D 1/02* (2020.01)
*B63H 25/02* (2006.01)
*B63H 25/42* (2006.01)

(52) U.S. Cl.
CPC ........... *G05D 1/0208* (2013.01); *B63H 25/02* (2013.01); *B63H 25/42* (2013.01)

(58) Field of Classification Search
CPC ....... G05D 1/0208; B63H 25/02; B63H 25/42
See application file for complete search history.

(56) References Cited

U.S. PATENT DOCUMENTS

| 2,968,192 | A | | 1/1961 | Fletcher |
| 4,009,678 | A | * | 3/1977 | North ..................... B63H 25/20 114/144 R |
| 6,142,841 | A | | 11/2000 | Alexander, Jr. et al. |

(Continued)

FOREIGN PATENT DOCUMENTS

| CA | 2279165 | 1/2001 |
| CA | 2282064 | 1/2001 |

(Continued)

OTHER PUBLICATIONS

John Bayless, Adaptive Control of Joystick Steering in Recreational Boats, Marquette University, Aug. 2017, https://epublications.marquette.edu/cgi/viewcontent.cgi?article=1439&context=theses_open.

(Continued)

*Primary Examiner* — Stephen P Avila
(74) *Attorney, Agent, or Firm* — Andrus Intellectual Property Law, LLP (57) ABSTRACT

A marine propulsion system includes at least two parallel propulsion devices that each generate forward and reverse thrusts, wherein the parallel propulsion devices are oriented such that their thrusts are parallel to one another, and at least one drive position sensor configured to sense a drive angle of the parallel propulsion devices. A lateral thruster is configured to generate starboard and port thrust to propel the marine vessel. A user input device is operable by a user to provide at least a lateral thrust command to command lateral movement of the marine vessel and a rotational thrust command to command rotational movement of the marine vessel. A controller is configured to control the parallel propulsion devices and the lateral thruster based on the lateral steering input and/or the rotational steering input and the drive angle so as to provide the lateral movement and/or the rotational movement.

20 Claims, 9 Drawing Sheets

(56) References Cited

U.S. PATENT DOCUMENTS

| | | |
|---|---|---|
| 6,234,100 B1 | 5/2001 | Fadeley et al. |
| 6,234,853 B1 | 5/2001 | Lanyi et al. |
| 6,354,892 B1 | 3/2002 | Staerzl |
| 6,402,577 B1 | 6/2002 | Treinen et al. |
| 6,406,340 B1 | 6/2002 | Fetchko et al. |
| 7,267,068 B2 | 9/2007 | Bradley et al. |
| 7,305,928 B2 | 12/2007 | Bradley et al. |
| 7,398,742 B1 | 7/2008 | Gonring |
| 7,467,595 B1 | 12/2008 | Lanyi et al. |
| 8,060,265 B2 | 11/2011 | Hallenstvedt et al. |
| 8,417,399 B2 | 4/2013 | Arbuckle et al. |
| 8,512,085 B1 | 8/2013 | Kobilic |
| 8,777,681 B1 | 7/2014 | McNalley et al. |
| 8,807,059 B1 | 8/2014 | Samples et al. |
| 9,039,468 B1 | 5/2015 | Arbuckle et al. |
| 9,039,469 B1 | 5/2015 | Calamia et al. |
| 9,132,902 B2 | 9/2015 | Angelle |
| 9,132,903 B1 | 9/2015 | Gable et al. |
| 9,183,711 B2 | 11/2015 | Fiorini et al. |
| 9,248,898 B1 | 2/2016 | Kirchhoff et al. |
| 9,355,463 B1 | 5/2016 | Arambel et al. |
| 9,615,006 B2 | 4/2017 | Terre et al. |
| 9,650,119 B2 | 5/2017 | Morikami et al. |
| 9,729,802 B2 | 8/2017 | Frank et al. |
| 9,734,583 B2 | 8/2017 | Walker et al. |
| 9,996,083 B2 | 1/2018 | Vojak |
| 9,908,605 B2 | 3/2018 | Hayashi et al. |
| 9,988,134 B1 | 6/2018 | Gable et al. |
| 10,037,701 B2 | 7/2018 | Harnett |
| 10,048,690 B1 | 8/2018 | Hilbert et al. |
| 10,055,648 B1 | 8/2018 | Grigsby et al. |
| 10,106,238 B2 | 10/2018 | Sidki et al. |
| 10,191,153 B2 | 1/2019 | Gatland |
| 10,431,099 B2 | 1/2019 | Stewart et al. |
| 10,259,555 B2 | 4/2019 | Ward et al. |
| 10,281,917 B2 | 5/2019 | Tyers |
| 10,338,800 B2 | 7/2019 | Rivers et al. |
| 10,444,349 B2 | 10/2019 | Gatland |
| 10,507,899 B2 | 12/2019 | Imamura et al. |
| 10,814,952 B2 * | 10/2020 | Inoue ................. G05D 1/0208 |
| 2005/0075016 A1 | 4/2005 | Bertetti et al. |
| 2006/0058929 A1 | 3/2006 | Fossen et al. |
| 2007/0066157 A1 | 3/2007 | Yamashita et al. |
| 2007/0089660 A1 | 4/2007 | Bradley et al. |
| 2009/0076671 A1 | 3/2009 | Mizutani |
| 2009/0197486 A1 | 8/2009 | Szilagyi et al. |
| 2010/0145558 A1 | 6/2010 | Kaji |
| 2011/0153125 A1 | 6/2011 | Arbuckle et al. |
| 2011/0172858 A1 | 7/2011 | Gustin et al. |
| 2015/0032305 A1 | 1/2015 | Lindeborg |
| 2015/0276923 A1 | 10/2015 | Song et al. |
| 2015/0378361 A1 | 12/2015 | Walker et al. |
| 2016/0214534 A1 | 7/2016 | Richards et al. |
| 2017/0176586 A1 | 6/2017 | Johnson et al. |
| 2017/0205829 A1 | 7/2017 | Tyers |
| 2017/0253314 A1 | 9/2017 | Ward |
| 2017/0365175 A1 | 12/2017 | Harnett |
| 2018/0057132 A1 | 3/2018 | Ward et al. |
| 2018/0081054 A1 | 3/2018 | Rudzinsky et al. |
| 2018/0259338 A1 | 9/2018 | Stokes et al. |
| 2018/0259339 A1 | 9/2018 | Johnson et al. |
| 2019/0202541 A1 * | 7/2019 | Pettersson ............... B63H 25/42 |
| 2019/0251356 A1 | 8/2019 | Rivers |
| 2019/0258258 A1 | 8/2019 | Tyers |
| 2019/0283855 A1 | 9/2019 | Nilsson |
| 2019/0308710 A1 | 10/2019 | Gai et al. |

FOREIGN PATENT DOCUMENTS

| | | |
|---|---|---|
| DE | 11 2013 004908 | 6/2015 |
| EP | 1 775 212 | 4/2007 |
| EP | 3 182 155 | 6/2017 |
| JP | 7-246998 | 10/1999 |
| JP | 2016049903 | 4/2016 |
| JP | 2017178242 | 10/2017 |
| KR | 20140011245 | 1/2014 |
| WO | 93 05406 | 3/1993 |
| WO | 2006040785 A1 | 4/2006 |
| WO | 2006 062416 | 6/2006 |
| WO | 2008 066422 | 6/2008 |
| WO | 2012 010818 | 1/2012 |
| WO | 2017 095235 | 6/2017 |
| WO | 2017167905 | 10/2017 |
| WO | 2018162933 | 9/2018 |
| WO | 2018183/// | 10/2018 |
| WO | 2018201097 | 11/2018 |
| WO | 2018 232377 | 12/2018 |
| WO | 2018232376 | 12/2018 |
| WO | 2018232377 A1 | 12/2018 |
| WO | 2019 011451 | 1/2019 |
| WO | 2019096401 | 5/2019 |
| WO | 2019126755 | 6/2019 |
| WO | 2019157400 | 8/2019 |
| WO | 2019201945 | 10/2019 |
| WO | 2019214829 A1 | 11/2019 |

OTHER PUBLICATIONS

European search report dated Aug. 24, 2021 in counterpart European Patent Application 21161518.2.

* cited by examiner

FIG. 5D  REVERSE

FIG. 5C  FORWARD

FIG. 5B  LATERAL

FIG. 5A  ROTATIONAL

FORWARD

FIG. 5E

REVERSE

MARINE PROPULSION CONTROL SYSTEM AND METHOD

FIELD

The present disclosure generally relates to methods and systems for propelling marine vessels, and more particularly to systems and methods for providing lateral and rotational propulsion with mechanically steered or other non-steer-by-wire steering arrangement.

BACKGROUND

The following U.S. Patents are incorporated herein by reference, in entirety:

Many different types of marine propulsion devices are well known to those skilled in the art. For example, outboard motors that are attached to the transom of a marine vessel, stern drive systems that extend in a rearward direction from the transom of a marine vessel, bow thrusters and other docking thrusters are well known to those skilled in the art. In addition to bow thrusters, certain types of docking thruster systems used in conjunction with marine vessels incorporate a plurality of propulsors that are responsive to the joystick manipulations or other control input by a marine vessel operator.

U.S. Pat. No. 6,234,853 discloses a docking system that utilizes the marine propulsion unit of a marine vessel, under the control of an engine control unit that receives command signals from a joystick or push button device, to respond to a maneuver command from the marine operator. The docking system does not require additional propulsion devices other than those normally used to operate the marine vessel under normal conditions. The docking or maneuvering system of the present invention uses two marine propulsion units to respond to an operator's command signal and allows the operator to select forward or reverse commands in combination with clockwise or counterclockwise rotational commands either in combination with each other or alone.

U.S. Pat. No. 6,402,577 discloses a hydraulic steering system in which a steering actuator is an integral portion of the support structure of a marine propulsion system. A steering arm is contained completely within the support structure of the marine propulsion system and disposed about its steering axis. An extension of the steering arm extends into a sliding joint which has a linear component and a rotational component which allows the extension of the steering arm to move relative to a moveable second portion of the steering actuator. The moveable second portion of the steering actuator moves linearly within a cylinder cavity formed in a first portion of the steering actuator.

U.S. Pat. No. 6,406,340 discloses a hydraulic steering assembly that applies a force to a tiller arms of twin marine, outboard propulsion units and rotates the propulsion units about a steering axis between a center position and hard over positions to each side of the center position. Each propulsion unit is supported for arcuate movement about a tilt axis which is generally perpendicular to the steering axis. There is a hydraulic steering apparatus mounted on a first of the propulsion units which includes a hydraulic cylinder pivotally connected to a member which is pivotally mounted on the tiller arm of the first propulsion unit. A tie-bar is pivotally connected to the steering apparatus and pivotally connected to the tiller arm of a second propulsion unit. For example, the tie-bar may be pivotally connected to the steering apparatus by a ball joint connected to the steering apparatus by a bracket which moves with the member.

U.S. Pat. No. 7,398,742 discloses a steering assist system providing differential thrusts by two or more marine propulsion devices in order to create a more effective turning moment on a marine vessel. The differential thrusts can be selected as a function of the magnitude of turn commanded by an operator of the marine vessel and, in addition, as a function of the speed of the marine vessel at the time when the turning command is received.

U.S. Pat. No. 7,467,595 discloses a method for controlling the movement of a marine vessel that rotates one of a pair of marine propulsion devices and controls the thrust magnitudes of two marine propulsion devices. A joystick is provided to allow the operator of the marine vessel to select port-starboard, forward-reverse, and rotational direction commands that are interpreted by a controller which then changes the angular position of at least one of a pair of marine propulsion devices relative to its steering axis.

U.S. Pat. No. 9,039,468 discloses a system that controls speed of a marine vessel that includes first and second propulsion devices that produce first and second thrusts to propel the marine vessel. A control circuit controls orientation of the propulsion devices between an aligned position in which the thrusts are parallel and an unaligned position in which the thrusts are non-parallel. A first user input device is moveable between a neutral position and a non-neutral detent position. When the first user input device is in the detent position and the propulsion devices are in the aligned position, the thrusts propel the marine vessel in a desired direction at a first speed. When a second user input device is actuated while the first user input device is in the detent position, the propulsion devices move into the unaligned position and propel the marine vessel in the desired direction at a second, decreased speed without altering the thrusts.

U.S. Pat. No. 10,259,555 discloses a method for controlling movement of a marine vessel near an object that includes accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 8,512,085 discloses a tie bar apparatus is for a marine vessel having at least first and second marine drives. The tie bar apparatus comprises a linkage that is geometrically configured to connect the first and second marine drives together so that during turning movements of the marine vessel, the first and second marine drives steer about respective first and second vertical steering axes at different angles, respectively.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a marine propulsion system includes at least two parallel propulsion devices that each generate forward and reverse thrusts, wherein the parallel propulsion devices are oriented such that their thrusts are parallel to one another, and at least one drive position sensor configured to sense a drive angle of the parallel propulsion devices. A lateral thruster is configured to generate starboard and port thrust to propel the marine vessel. A user input device is operable by a user to provide at least a lateral thrust command to command lateral movement of the marine vessel and a rotational thrust command to command rotational movement of the marine vessel. A controller is configured to control the parallel propulsion devices and the lateral thruster based on the lateral steering input and/or the rotational steering input and the drive angle so as to provide the lateral movement and/or the rotational movement commanded by the user without controlling the drive angle.

One embodiment of a method of controlling propulsion of a marine vessel includes receiving at least one of a lateral steering input to command lateral movement of the marine vessel and a rotational steering input to command rotational movement of the marine vessel, and then sensing at least one of a drive angle of a set of parallel propulsion devises on the marine vessel and a yaw rate of the marine vessel. The drive angle and/or the yaw rate are then utilized to determine a magnitude of thrust and a forward or reverse direction of thrust for each propulsion device in the set of parallel propulsion devices and to determine an activation command and a starboard or port direction of thrust for a lateral thruster in order to effectuate the lateral movement and/or the rotational movement commanded by the user without controlling the drive angle of the set of parallel propulsion devices.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

The inventors have recognized a need for vessel control systems that provide lateral and rotational user control, such as user control provided by standard joystick systems, for non-steered-by-wire vessels where a steering wheel is mechanically connected via a conventional steering system to propulsion devices mounted to the stern of the marine vessel. For example, on vessels configured for high speed applications, such as racing vessels, the mechanically-steered propulsion devices are typically tied together, such as with a tie bar. This provides robust steering actuation and control at high load conditions and high vessels speeds. As another example, lower cost vessels typically implement conventional mechanical steering systems where the propulsion devices are mechanically connected to the steering wheel and are jointly steered, and the propulsion devices are often connected with a tie bar. In both of these applications, as well as other non-steer-by-wire steering and propulsion systems, the propulsion devices are maintained in parallel such that the thrusts effectuated are parallel to one another. These existing systems do not provide lateral thrust control or automatic rotational thrust control where a user can instruct rotational movement without any forward or backward movement. No joysticking or other lateral thrust control elements are currently available for non-steer-by-wire systems. Currently available joysticking systems require steer-by-wire control where each propulsion device can be steered separately and the propulsion devices can be placed at angles that are not parallel to one another.

Based on the foregoing problems and challenges in the relevant art, the inventors developed the disclosed propulsion system and method allowing lateral and rotational steering control, such as via a joystick, on mechanically steered and other non-steer-by-wire vessels. The disclosed system and method enable lateral and rotational steering control by a user without controlling or adjusting the angle of the propulsion devices with respect to the marine vessel, and thus can be implemented on marine vessels with conventional mechanical steering of the propulsion devices. In one embodiment, the disclosed system includes a set of two or more parallel propulsion devices that each generate forward and reverse thrusts and a sensor system configured to determine a drive angle of the parallel propulsion devices. In some embodiments, the system may further include a lateral thruster configured to generate lateral thrusts in each of the starboard and port directions. A user input device, such as a joystick or a keypad, is manually operable by a user to provide at least lateral and rotational steering inputs to command corresponding movements of the marine vessel, and a controller is configured to control magnitude and direction of thrust by the parallel propulsion devices and/or the lateral thruster to effectuate the commanded movement without requiring any steering control over the propulsion devices.

Figure 1:
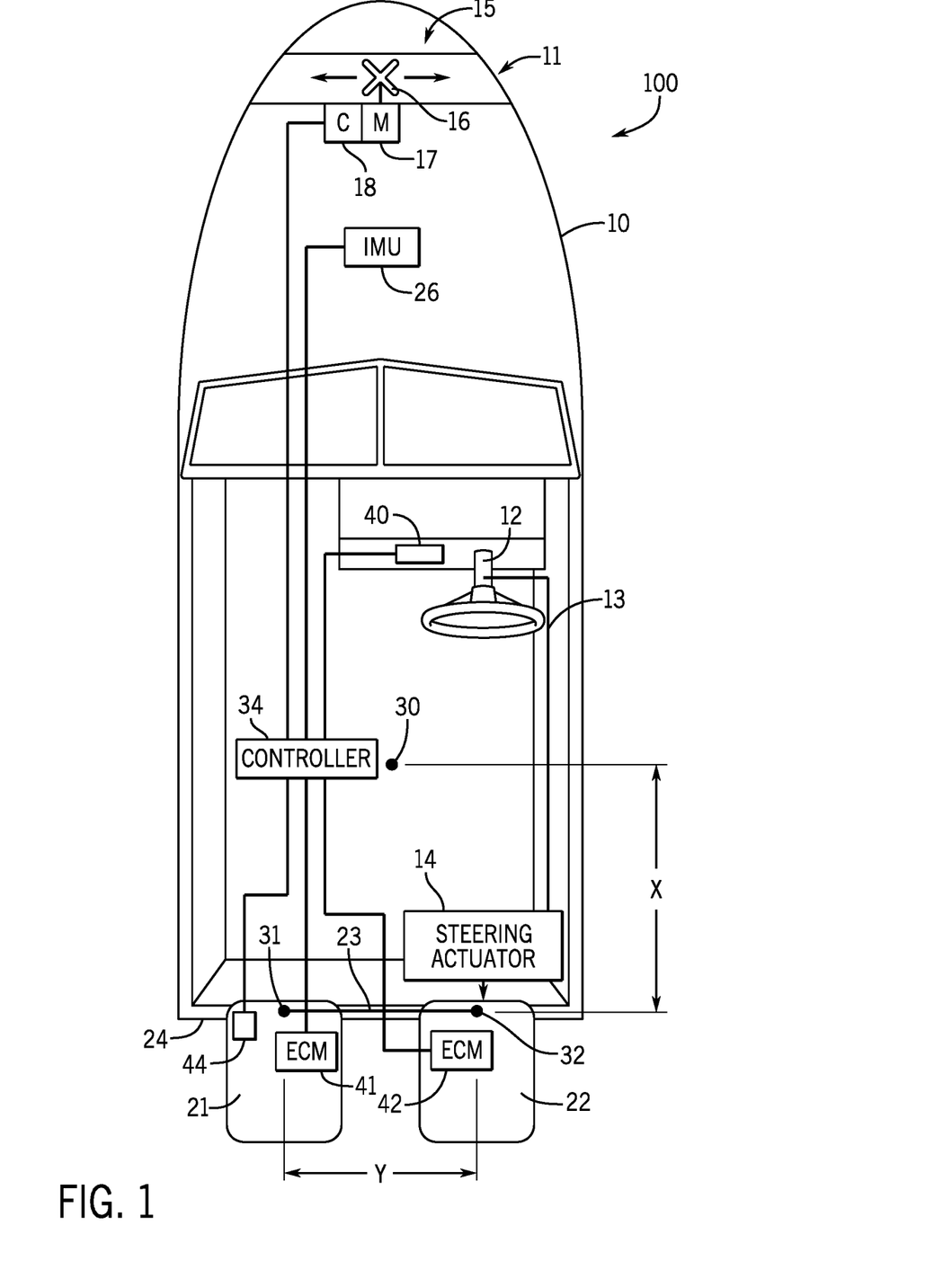
FIG. 1 is a schematic illustration of a marine vessel with one embodiment of a propulsion system according to the present disclosure.

FIG. 1 is a schematic representation of a marine vessel 2 equipped with propulsion system 100 including two propulsion devices 21 and 22 attached to the transom 24 and arranged in parallel. The number of propulsion devices is exemplary and a person having ordinary skill in the art will understand in light of the present disclosure that any number of two or more propulsion devices may be utilized in the disclosed system and method. In the depicted example, the propulsion devices 21 and 22 are connected and maintained in parallel via a tie bar 23. Tie bars are conventional in many marine applications, including high-speed racing vessels, which often employ tie bars between engines to assist in distributing steering loads during high-speed operations. The tie bars may attach to the propulsion devices at the location of the steering axes 31 and 32 of the parallel propulsion devices 21 and 22, respectively. The steering axes 31 and 32 are separated by a dimension Y and at a distance X from the center of turn 30 (COT), which could also be the effective center of gravity (COG). The marine vessel 10 is maneuvered by causing the first and second propulsion devices to rotate about their respective steering axis 31 and 32. The parallel propulsion devices 21 and 22 are rotated in response to an operator's manipulation of the steering wheel 12, which is mechanically connected to the steering actuator 14 which rotates the propulsion devices 21 and 22, as is conventional. Mechanical connection systems 13 for transmitting rotational movement of the steering wheel 12 to the steering actuator 14 are well-known, such as steering linkage systems and or push/pull cable systems, which may include hydraulic actuated steering systems including a hydraulic steering actuator 14. Rotating the parallel propulsion devices 21 and 22 and effectuating thrusts thereby cause rotation of the marine vessel 10 about the effective COT 30.

Figure 2A:
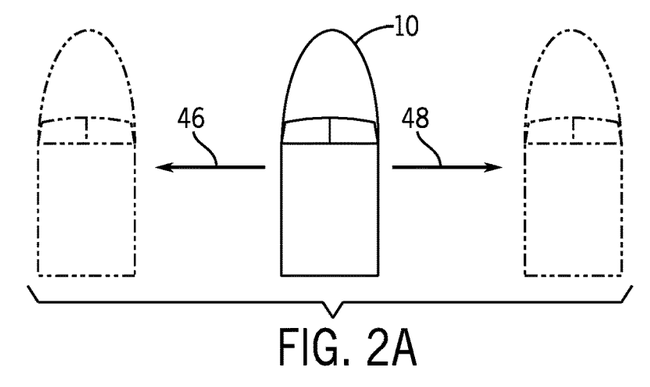
FIGS. 2A-2E are schematic illustrations of various movements of a marine vessel.
Figure 2B:
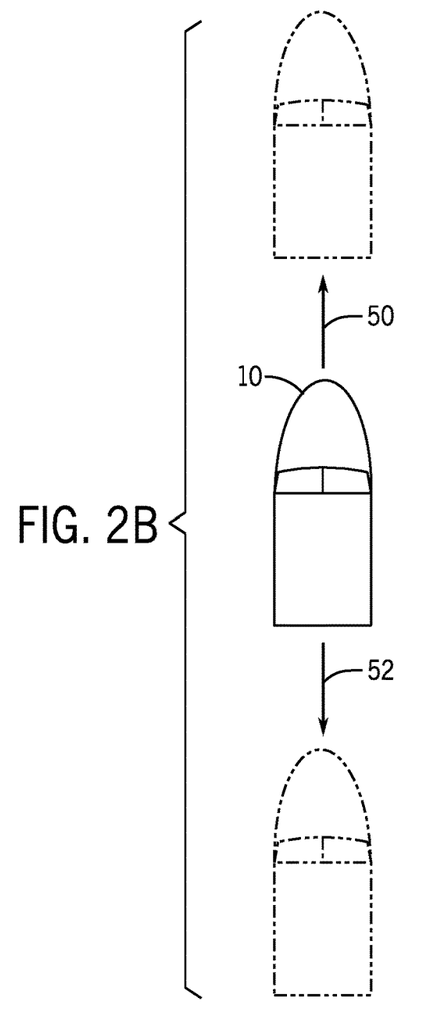
Figure 2C:
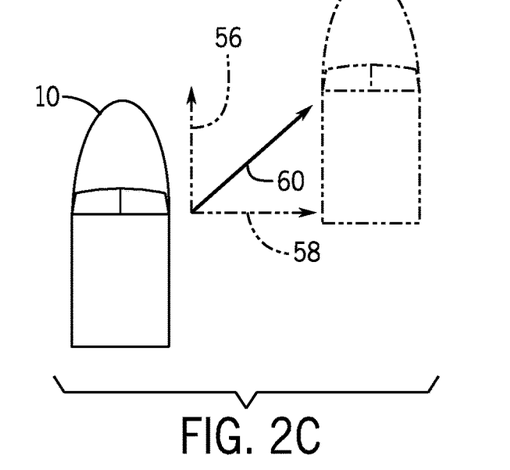
Figure 2D:
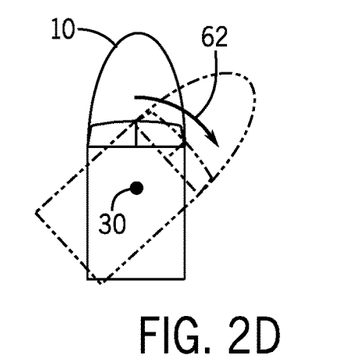
Figure 2E:
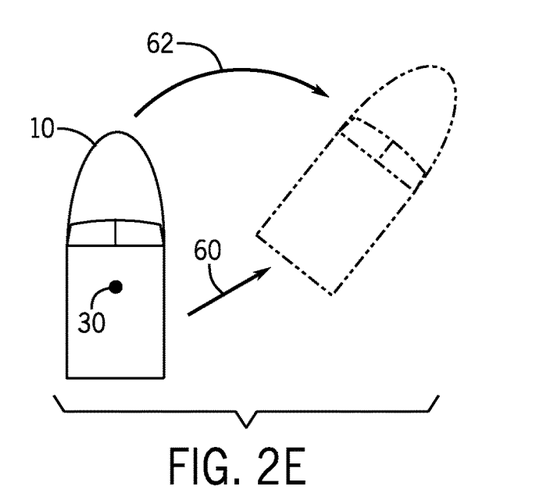

The propulsion system 100 further includes a user input device 40, such as a joystick or a keypad, operable by a user to provide at least a lateral steering input to command lateral movement of the marine vessel and a rotational steering input to command rotational movement of the marine vessel 10. FIGS. 2A-2E illustrate exemplary vessel movements that may be commanded via the user input device 40. In FIG. 2A, the vessel 10 is shown moving laterally in the port direction 46 and the starboard direction 48 without any forward or reverse motion and without any rotation about its COT 30. FIG. 2B shows the vessel 10 moving in the forward 50 direction and backward 52 direction. FIG. 2C shows a combination of forward and starboard motions of the vessel 10, where the forward movement is represented by the dashed arrow 56 and the starboard movement is represented by the dashed arrow 58. The resultant motion vector 60 moves the vessel in the forward and starboard directions without any rotation. FIG. 2D illustrates a clockwise rotation 62 of the marine vessel 10 about the COT 30 without any translation movement, including any forward/reverse movement or lateral movement. FIG. 2E illustrates a combination of rotation 62 and translation 60, which is in both the forward and starboard directions.

The disclosed system and method enable lateral and rotational movement of the marine vessel, such as that illustrated in FIGS. 2A-2E, without requiring steering control of the propulsion devices 21 and 22, which are mechanically steered by the steering wheel 12. Thus, the disclosed system and method control magnitude and forward or reverse direction of thrust for each parallel propulsion device without adjusting or otherwise controlling the drive angle of the set of parallel propulsion devices.

The user steering inputs provided at the user input device 40 are received at the controller 34 which is communicatively connected to the engine control module (ECM) 41 and 42 of each propulsion device 21 and 22, respectively. Thereby, the controller 34 can communicate instructions to each ECM 41 and 42 to effectuate a commanded magnitude of thrust and a commanded direction of thrust (forward or reverse), as is necessary to effectuate the lateral and/or rotational steering inputs commanded at the user input device 40. In certain embodiments, the system 100 includes a lateral thruster 15 configured to effectuate lateral thrust on the vessel 10 in the starboard and port directions. In the depicted example, the lateral thruster 15 is a bow thruster positioned at a bow region 11 of the vessel 10 and configured to effectuate lateral thrust at the bow. Bow thrusters are well known to those skilled in the art, as are other types and locations of docking thruster systems configured to effectuate lateral thrusts on the marine vessel, which may be placed at other locations on the vessel 10 besides the bow 11. A person having ordinary skill in the art will understand in view of the present disclosure that the disclosed propulsion system 100 may include other types and locations of lateral thrusters 15, which may be an alternative to or in addition to a bow thruster.

The lateral thruster 15 includes a fan 16 or propeller that is rotated by a bi-directional motor 17 in forward or reverse direction in order to effectuate lateral thrust in the starboard and port directions. The controller 34 may be communicatively connected to a controller 18 for the lateral thruster 15 in order to control activation and direction of thrust by the lateral thruster 15. In one embodiment, the rotation, and thus is either on or off and rotates in the clockwise and counter-clockwise directions at a single speed. In other embodiments, the lateral thruster 15 is a variable speed thruster wherein the motor 17 is controllable to rotate the fan 16 at two or more speeds. For example, the motor 17 may be a brushless DC motor configured for variable multi-speed control of the fan 16 in both the clockwise and counter-clockwise rotation directions.

The disclosed system and method take advantage of the parallelism of the propulsion devices 21 and 22. By effectuating a forward thrust by one of the propulsion devices and a reverse thrust by the other, where the thrust vectors are parallel and equal in magnitude, the translation forces will couple and counteract one another. The coupled forces will impart a torque about the COT 30. If the drive angle of the propulsion devices is known, then vector analysis can be performed in order to effectuate any rotational movement and, an embodiment incorporating a lateral thruster 15, lateral movement in the port direction 46 and the starboard direction 48, as well as forward direction 50 and reverse direction 52 movement. In certain embodiments, the system 100 may be configured to provide translational movement in other translational directions combining forward/reverse and port/starboard thrust.

Figure 3:
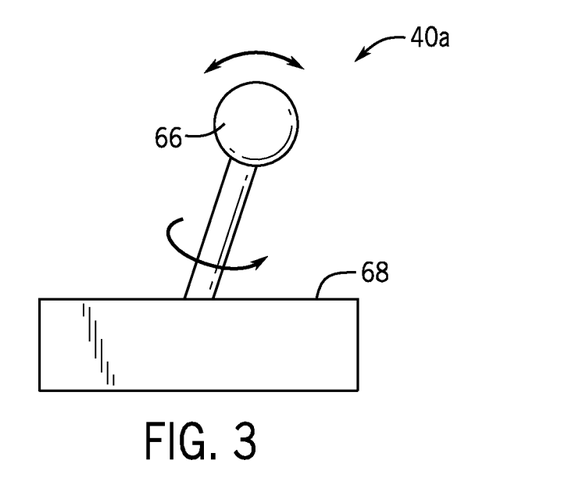
FIG. 3 illustrates an exemplary joystick user input device.
Figure 4:
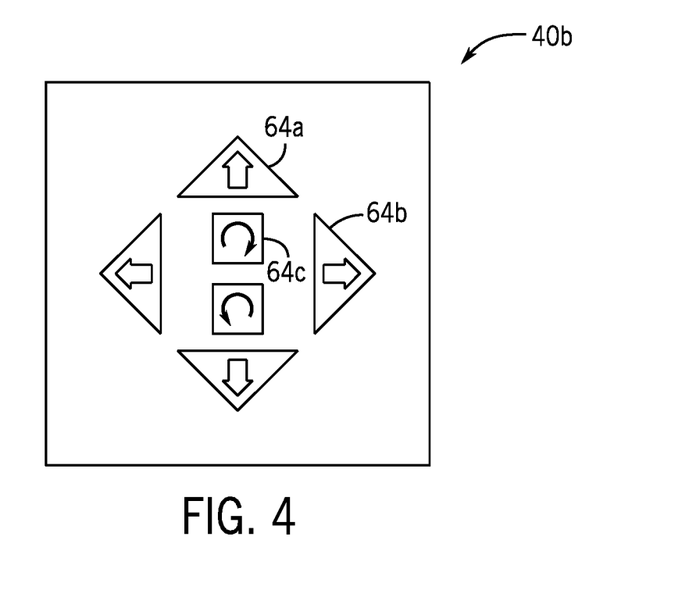
FIG. 4 illustrates an exemplary keypad user input device.

FIGS. 3 and 4 exemplify two possible types of user input devices 40. FIG. 3 depicts a well-known joystick device that comprises a base 68 and a moveable handle 66 suitable for movement by an operator. Typically, the handle can be moved left and right, forward and back, as well as rotated relative to the base 68 in order to provide corresponding movement commands for the propulsion system. The operation of joystick thrust control is well known to those skilled in the art and is also describes in references incorporated herein by reference. FIG. 4 depicts an alternative user input device 40b being a keypad with buttons 64 associated with each of the right, left, forward, backward, and rotational movement directions. Thus, a forward button 64a can be pressed by a user in order to provide a forward thrust command to move the marine vessel forward and key 64b can be pressed by a user to input a lateral thrust command to command lateral movement of the marine vessel 10. Similarly, the clockwise rotation key 64c can be pressed by a user to input a clockwise rotational thrust command to command clockwise rotational movement of the marine vessel 10. The other keys on the keypad 40b operate similarly.

The disclosed propulsion system 100 enables joystick control, or control by another user input device operable to provide lateral and rotational thrust control, to mechanically linked and steered drives. Thus, steer-by-wire is not required and the controller 34 is configured to calculate thrust magnitude and direction utilizing the current position of the marine drives, whatever it may be. The system 100 is configured to take advantage of parallelism of the propulsion devices 21 and 22 such that thrust by the two or more propulsion devices can counteract each other in order to effectuate the desired resultant rotational and translational thrust. One embodiment having a lateral thruster 15, the propulsion system 100 can effectuate lateral movement in the lateral movement directions 46 and 48 and the forward and reverse movement directions 50 and 52, as shown in FIGS. 2A and 2B.

FIGS. 5A-5F exemplify this force coupling control between the propulsion devices 21 and 22 and the lateral thruster 15 in order to effectuate rotational and translational movement of the vessel without changing or controlling the drive angle of the propulsion devices 21 and 22. The controller 34 is configured to measure the drive angle θ of the parallel propulsion devices 21 and 22, or to otherwise determine the rotational effect of thrusts from the propulsion devices 21 and 22. In one embodiment, a drive position sensor 44 (FIG. 1) is configured to sense a drive angle of at least one of the parallel propulsion devices 21 and 22. Given that the propulsion devices 21 and 22 are maintained in parallel, such as by a tie bar 23, the drive angle of only one propulsion device 21, 22 needs to be sensed. However, in other embodiments, each propulsion device 21 and 22 may be equipped with a position sensor, such as to provide redundancy in case of failure. The drive angle sensed by the position sensor provides information about the drive angle, or steering position, of the propulsion devices, which is manually controlled by the operator via the steering wheel 12 and is not controlled by the controller 34. Based on the drive angle, the controller 34 can adjust to the scale and the direction of thrust by the parallel propulsion devices 21 and 22 and/or the lateral thruster 15. If the drive angle θ changes, then the controller 34 will adjust the thrust magnitudes and directions to accommodate the new steering position sensed by the drive position sensor 44.

In another embodiment, the controller 34 may be configured to utilize yaw rate, such as from an inertial measurement unit 26 or other rotational sensor capable of measuring yaw of the marine vessel 10, as the basis for controlling thrust magnitude and direction. A yaw rate sensor, such as an inertial measurement unit (IMU), may be included instead of the drive position sensor 44. In such an embodiment, the controller 34 receives yaw position and/or yaw rate from the IMU 26 and determines the magnitude of thrust and selects a forward or reverse direction of thrust for each propulsion device 21 and 22 based on the yaw rate command. In one embodiment, the controller 34 estimates a drive angle θ of the parallel propulsion devices based on the sensed yaw rate and calculates the thrust magnitudes and directions accordingly. For example, the controller 34 may receive engine speed and/or throttle position from the ECMs 41 and 42 and may estimate the drive angle based on the yaw rate and the thrust-magnitude-related values, such as RPM or throttle position.

The sensed yaw rate can further be used as feedback control for adjusting the thrust commands. Namely, the controller 34 may determine an expected yaw rate associated with the lateral and/or rotational thrust command from the user input device 40 and may compare the measured yaw rate from the IMU 26 to the expected yaw rate and adjust the thrust commands in order to reduce the difference between the measured yaw rate and the expected yaw rate. Such feedback control can be utilized in embodiments with or without the drive position sensor 44. In such embodiments, the propulsion system 100 includes both a drive position sensor 44 and an IMU 26 or other yaw rate sensor.

Figure 5A:
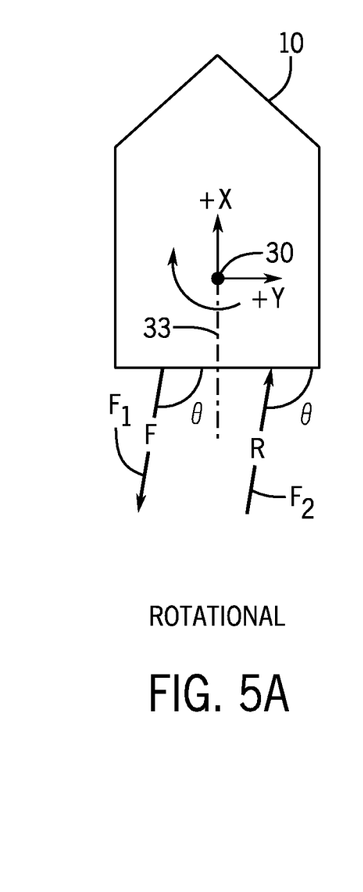
FIGS. 5A-5F depict various thrust vectors on a marine vessel to effectuate various vessel movements.

FIGS. 5A-5F depict exemplary thrust scenarios to effectuate rotational and translational motion when the drives are at drive angle θ. In FIG. 5A the propulsion devices 21 and 22 effectuate opposite thrusts with equal magnitude so as to effectuate a clockwise rotational movement of the vessel 10. The force vectors from the propulsion devices on the port and starboard sides of the center line 33 on the stern of the marine vessel, and, where utilized, the thrust vector by the bow thruster 15, are added through normal vector analysis in order to result in the desired rotational and/or translational movement commanded at the user input device 40. Namely, the thrust vector F1 for the first propulsion device 21, or the total thrust of the propulsion devices on the port side of the center line 33, are in the forward thrust direction to effectuate forward movement of the marine vessel. The thrust vector F2 of the starboard-side propulsion device 22, or the sum of the propulsion devices on the starboard side of the center line 33 of the marine vessel 10 are in the reverse thrust direction so as to effectuate reverse movement of the marine vessel 10. The forward thrust vector F1 and the reverse thrust vector F2 are equal in magnitude such that the translational forces cancel and only a resultant moment is effectuated in order to turn the marine vessel in the clockwise rotational direction. Here, the bow thruster 15 is not operated and remains in the off state.

Figure 5B:
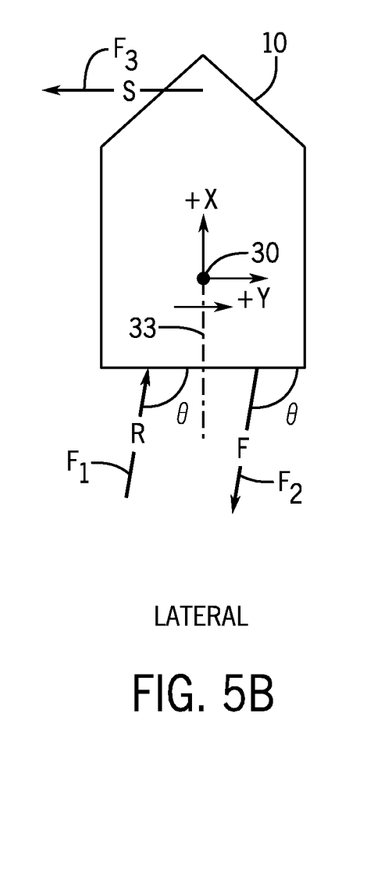

FIG. 5B depicts force vectors F1 through F3 effectuated to produce lateral movement of the vessel 10 in the starboard direction. Here, the lateral thruster 15 is activated in order to effectuate a starboard thrust vector F3 at the bow of the marine vessel. The thrust by the bow thruster 15 generates a clockwise moment about the center of turn 30 in addition to a lateral force in the starboard direction. The moment caused by the bow thruster 15 is counteracted by effectuating an equal and opposite moment with the propulsion devices 21 and 22 such that the resulting moment equals zero and only the lateral force F3 remains such that the marine vessel 10 is moved in the starboard direction.

Figure 5C:
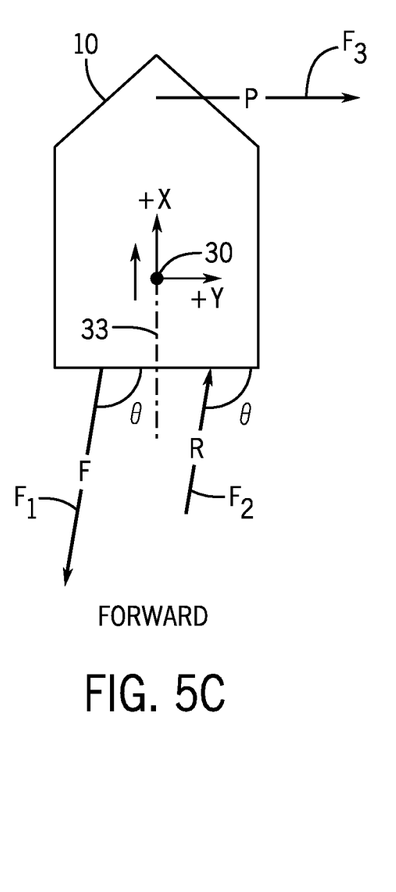

FIG. 5C depicts force vectors for effectuating forward movement of the marine vessel 10 when the propulsion devices 21 and 22 are at angle θ. Here the bow thruster 15 effectuates a thrust F3 in the port direction, which generates a counterclockwise moment about the COT 30. The counterclockwise moment is counteracted by the thrust F1 and F2 of the propulsion devices at the stern of the marine vessel 10 where the port side propulsion devices effectuate a forward thrust F1 and the starboard side propulsion devices effectuate a thrust F2 in the reverse direction to generate a clockwise moment. However, the forward thrust vector F1 is greater in magnitude than the reverse thrust vector, and a resultant total thrust is exerted on the marine vessel 10 in order to move it forward.

Figure 5D:
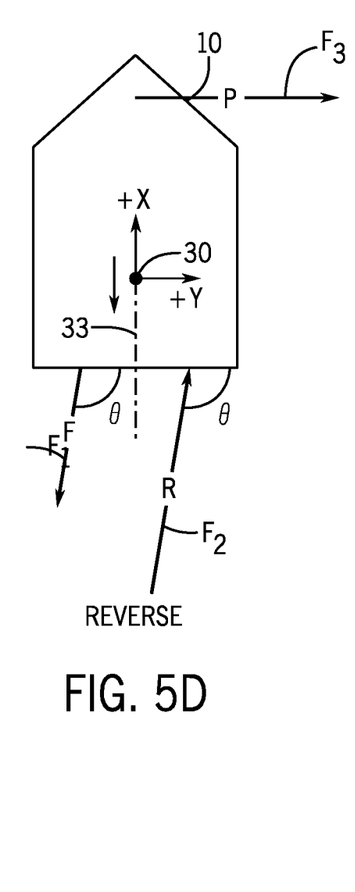

FIG. 5D depicts an opposite scenario which effectuates a total thrust on the marine vessel 10 in order to move it in the reverse direction. The bow thruster 15 is commanded to exert a thrust F3 in the port direction, which generates a moment about the center of turn 30 that is counteracted by the thrust F1 and F2 of the propulsion devices at the stern of the vessel 10. Here, the thrust vector F2 in the reverse direction is greater in magnitude than the thrust vector F1 in the forward direction, and thus a total thrust is effectuated to move the marine vessel in the reverse direction.

Figure 5E:
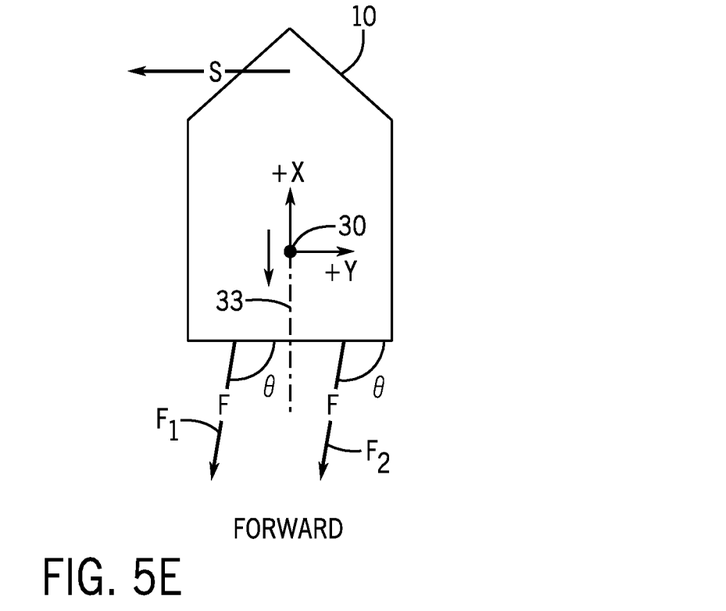
Figure 5F:
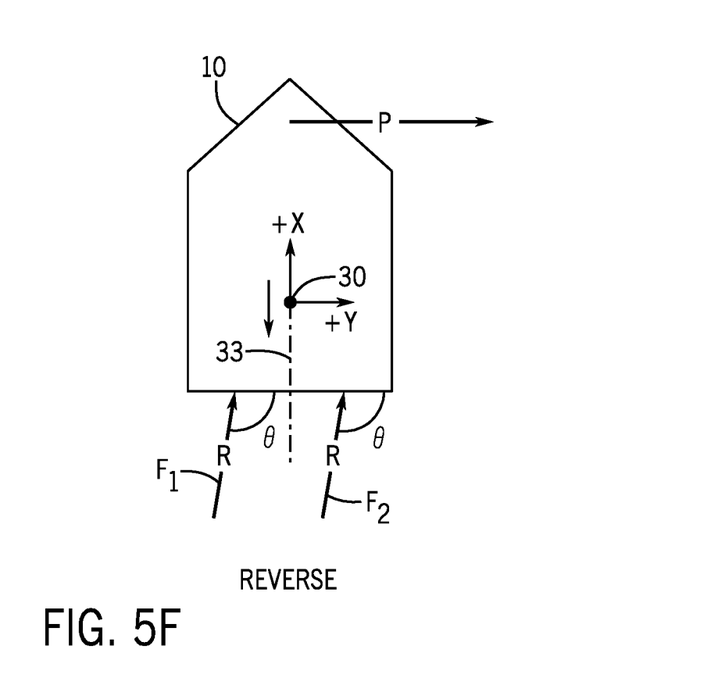

As will be recognized by a person having ordinary skill in the art in view of this disclosure, other combinations of thrusts may be effectuated in order to accomplish the total thrust commanded by the user. FIGS. 5E and 5F demonstrate additional exemplary thrust combinations for effectuating forward and reverse thrusts, respectively. In FIG. 5E, both propulsion devices are controlled to effectuate equal forward thrusts F1 and F2 and the bow thruster 15 is commanded to exert a thrust F3 in the starboard direction, which generates a moment about the center of turn 30 that counteracts the moment generated by the thrusts F1 and F2. In FIG. 5F, both propulsion devices are controlled to effectuate equal reverse thrusts F1 and F2 and the bow thruster 15 is commanded to exert a thrust F3 in the port direction, which generates a moment about the center of turn 30 that counteracts thrusts F1 and F2.

Figure 6:
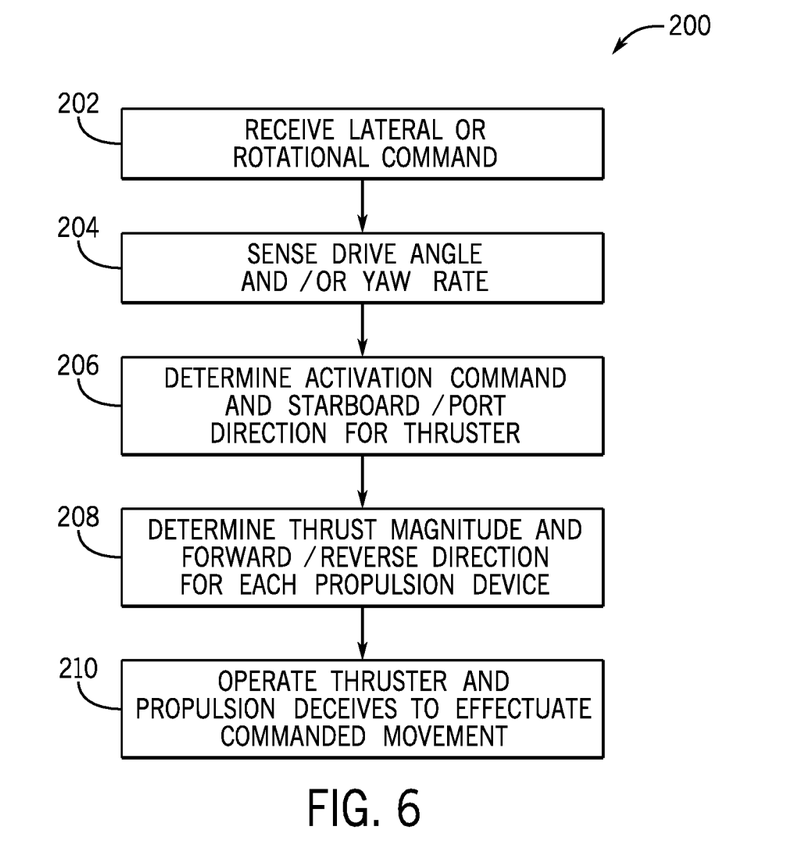
FIGS. 6-8 depict methods of controlling propulsion of the marine vessel in accordance with embodiments of the present disclosure.
Figure 7:
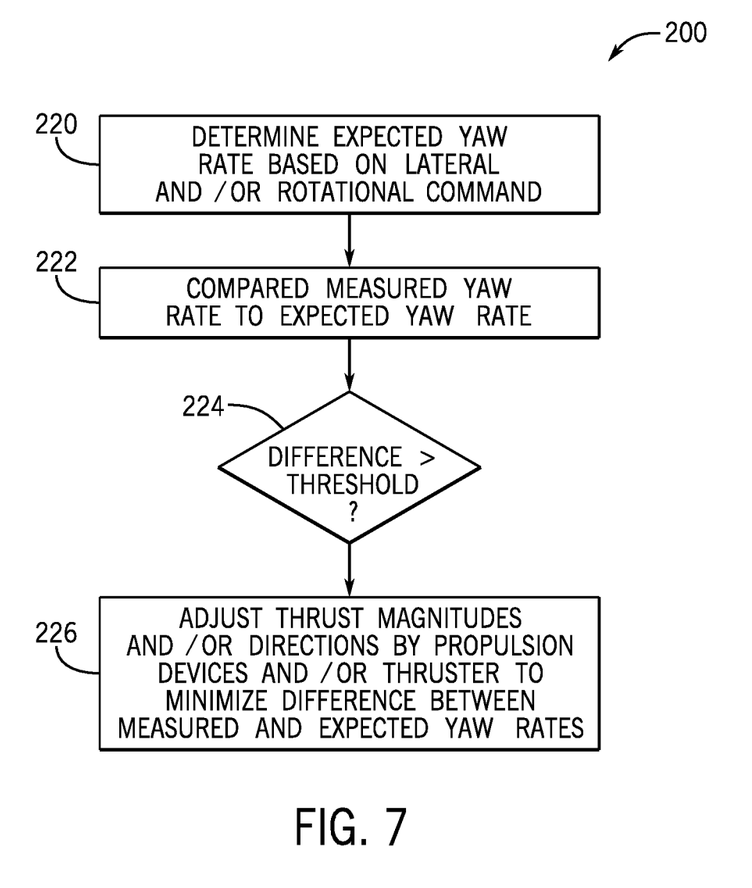
Figure 8:
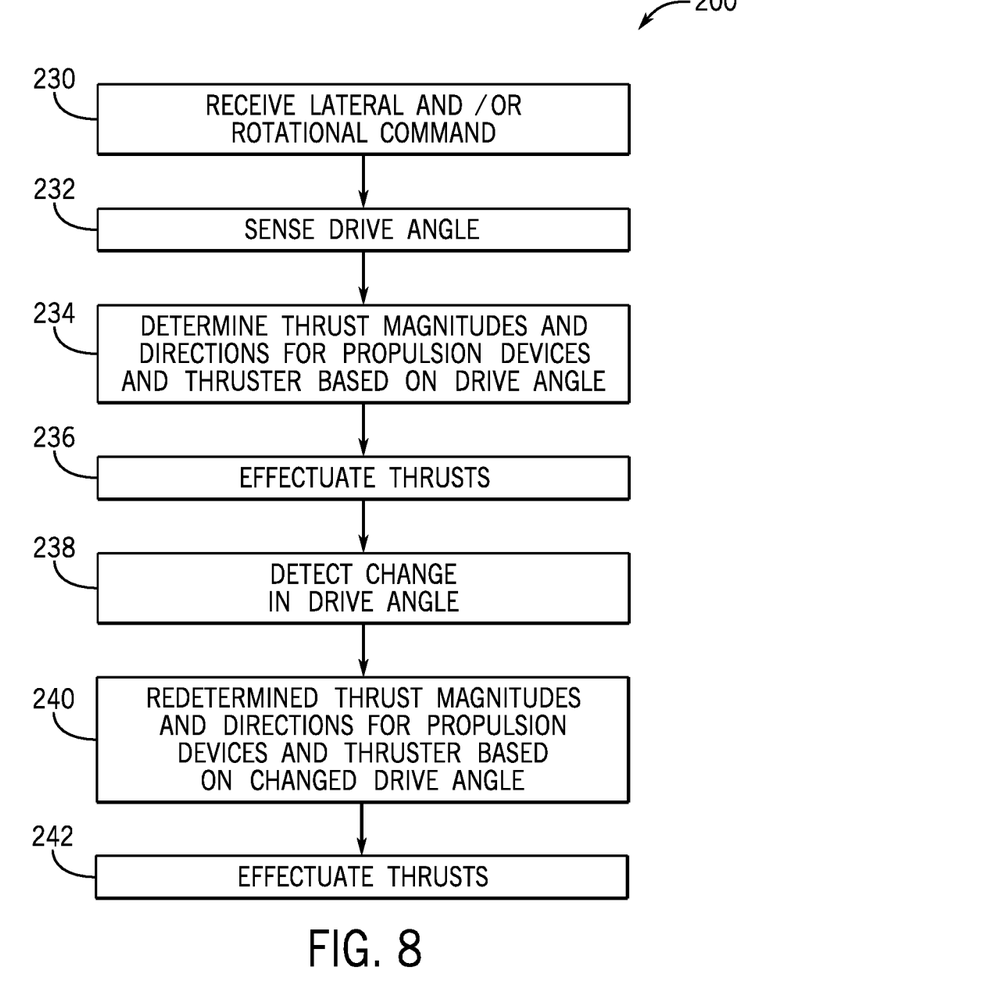

FIGS. 6-8 depict methods 200, or portions of, for controlling propulsion of a marine vessel in accordance with embodiments of the present disclosure. In FIG. 6, a lateral or rotational thrust command is received at a user input device at step 202, such as at a joystick. The drive angle of the parallel propulsion devices and/or the yaw rate of the marine vessel are sensed at step 204 and that information is used at steps 206 and 208 to determine thrust commands. In embodiments where no drive position sensor 44 is provided and only IMU data or yaw rate information from another type of motion sensor is available, the system may be configured to estimated drive angle based on yaw rate, as is described above. For example, the drive angle θ may be estimated based on engine speed and/or throttle position by each ECM 41 and 42 and a yaw rate. An activation command and a starboard or a port direction command are determined for the lateral thruster at step 206, and a thrust magnitude and forward or reverse direction command are determined for each of the parallel propulsion devices at step 208. The lateral thruster and the propulsion devices are then operated at step 210 to effectuate the commanded movement.

FIG. 7 depicts steps for using sensed yaw rate as feedback for controlling the thrusts. An expected yaw rate is determined at step 220 based on the lateral and/or rotational command. For example, a lookup table or formula may be used to associate the joystick or keypad input with a yaw rate. The measured yaw rate, such as by the IMU, is then compared to the expected yaw rate at step 222. If the difference between the measured yaw rate and the expected yaw rate exceeds a threshold at step 224, then the thrust magnitudes and or thrust directions by the propulsion devices and/or the lateral thruster are re-determined so as to minimize the difference between the measured and expected yaw rates.

FIG. 8 depicts method 200 steps for controlling the parallel propulsion devices in the lateral thruster using drive position information. The lateral or rotational command via the user input device at 230. The drive angle θ is sensed at 232 by a drive position sensor 44 configured to sense an angular position of at least one of the parallel propulsion devices on the transom of the marine vessel. The thrust magnitude and directions for each of the parallel propulsion devices and the thruster are then determined at step 234, as is described above, based on the measured drive angle. The thrusts are then effectuated at step 236. If a change in drive angle is detected, as represented at step 238, then the thrust magnitudes and directions for the propulsion devices and the lateral thruster are re-determined at step 240 based on the changed drive angle. The new thrusts are then effectuated at step 242. Thereby, if the drive angle θ, or steering position, of the parallel propulsion devices 21 and 22 changes due to the user providing a steering input at the steering wheel 12, then the thrust vector calculation will be re-performed so as to effectuate thrusts that are appropriate to maintain the commanded motion of the marine vessel.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A marine propulsion system comprising:
   at least two steerable parallel propulsion devices that each generate forward and reverse thrusts, wherein the steerable parallel propulsion devices are steerable together to remain oriented such that their thrusts are parallel to one another;
   at least one drive position sensor configured to sense a drive angle of at least one of the steerable parallel propulsion devices;
   a lateral thruster configured to generate starboard and port thrusts to propel a marine vessel;
   a user input device operable by a user to provide at least a lateral thrust command to command lateral movement of the marine vessel and a rotational thrust command to command rotational movement of the marine vessel; and
   a controller configured to control the steerable parallel propulsion devices and the lateral thruster based on the lateral thrust command and/or the rotational thrust command and the drive angle so as to provide the lateral movement and/or the rotational movement commanded by the user without controlling the drive angle of the steerable parallel propulsion devices.

2. The system of claim 1, wherein the controller is further configured to:
   determine, based on the drive angle, a magnitude of thrust and a forward or reverse direction of thrust for each parallel propulsion device;
   determine an activation command and a starboard or port direction of thrust for the lateral thruster;
   control the steerable parallel propulsion devices based on the magnitude of thrust and the forward or reverse direction of thrust and the lateral thruster based on the activation command and the starboard or port direction of thrust.

3. The system of claim 1, wherein the user input device is one of a joystick or a key pad.

4. The system of claim 1, wherein the at least two steerable parallel propulsion devices are connected together by a tie bar.

5. The system of claim 1, further comprising a steering wheel mechanically linked to at least one steering actuator configured to rotate the steerable parallel propulsion devices about a steering axis so as to control the drive angle.

6. The system of claim 2, wherein the controller is configured to redetermine the magnitude of thrust and the forward or reverse direction of thrust for each parallel propulsion device following a change in the drive angle.

7. The system of claim 1, wherein the lateral thruster is a variable speed thruster and wherein the lateral thrust command for the lateral thruster controls a speed of rotation of the variable speed thruster.

8. The system of claim 1, further comprising a yaw rate sensor configured to measure a yaw rate of the marine vessel, wherein the steerable parallel propulsion devices and the lateral thruster are further controlled based on the yaw rate of the marine vessel.

9. A marine propulsion system comprising:
- at least two parallel propulsion devices that each generate forward and reverse thrusts, wherein the parallel propulsion devices are oriented such that their thrusts are parallel to one another;
- at least one yaw rate sensor configured to measure a yaw rate of a marine vessel;
- a lateral thruster configured to generate starboard and port thrusts to propel the marine vessel;
- a user input device manually operable by a user to provide at least a lateral thrust command to command lateral movement of the marine vessel and a rotational thrust command to command rotational movement of the marine vessel; and
- a controller configured to:
  - estimate a drive angle of the parallel propulsion devices based on the measured yaw rate; and
  - control the parallel propulsion devices and the lateral thruster based on the lateral thrust command and/or the rotational thrust command and the estimated drive angle so as to provide the lateral movement and/or the rotational movement commanded by the user without controlling the drive angle of the parallel propulsion devices.

10. The system of claim 9, wherein the controller is further configured to:
- determine that the measured yaw rate differs by at least a threshold amount from an expected yaw rate associated with the lateral thrust command and/or the rotational thrust command;
- reestimate the drive angle of the parallel propulsion devices based on the difference between the measured yaw rate and the expected yaw rate.

11. The system of claim 9, wherein the user input device is a joystick.

12. The system of claim 9, wherein the at least two parallel propulsion devices are connected together by a tie bar.

13. A method of controlling propulsion of a marine vessel, the method comprising:
- receiving from a user input device at least one of a lateral thrust command to command lateral movement of a marine vessel and a rotational thrust command to command rotational movement of the marine vessel;
- sensing at least one of a drive angle of a set of steerable parallel propulsion devices on the marine vessel and a yaw rate of the marine vessel;
- determining, based on the lateral thrust command and/or the rotational thrust command and the drive angle and/or the yaw rate, a magnitude of thrust and a forward or reverse direction of thrust for each propulsion device in the set of steerable parallel propulsion devices and an activation command and a starboard or a port direction of thrust for a lateral thruster; and
- controlling each propulsion device and the lateral thruster so as to provide the lateral movement and/or the rotational movement commanded at the user input device without controlling the drive angle of the steerable parallel propulsion devices.

14. The method of claim 13, wherein the drive angle is sensed by at least one drive position sensor associated with one of the propulsion devices in the set of propulsion devices.

15. The method of claim 13, further comprising detecting a change in the drive angle of the steerable parallel propulsion devices and then redetermining at least the magnitude of thrust and the forward or reverse direction of thrust for each propulsion device in the set of steerable parallel propulsion devices based on the changed drive angle and the lateral thrust command and/or the rotational thrust command.

16. The method of claim 15, wherein the drive angle is sensed by a drive position sensor and the change in drive angle is detected based on the output from the drive position sensor over time.

17. The method of claim 13, further comprising:
- determining that the sensed yaw rate differs by at least a threshold amount from an expected yaw rate associated with the lateral thrust command and/or the rotational thrust command;
- redetermining at least the magnitude of thrust and the forward or reverse direction of thrust for each propulsion device in the set of steerable parallel propulsion devices based on a difference between the sensed yaw rate and the expected yaw rate.

18. The method of claim 17, further comprising estimating a drive angle of the steerable parallel propulsion devices based on the sensed yaw rate, and then calculating the magnitude of thrust and the forward or reverse direction of thrust for each propulsion device based on the estimated drive angle.

19. The method of claim 13, wherein the lateral thruster is a single speed thruster and the activation command for the lateral thruster is one of an on command or an off command.

20. The method of claim 13, wherein the lateral thruster is a variable speed thruster and wherein the activation command for the lateral thruster controls a speed of rotation of the variable speed thruster.

* * * * *